Figure 1:
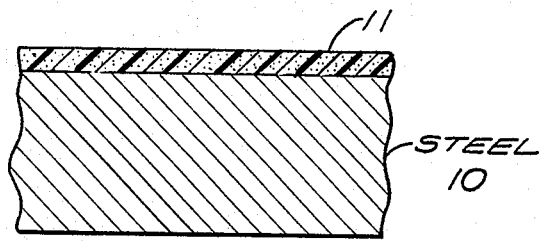

United States Patent [19]

Neelameggham et al.

[11] Patent Number: 4,582,727
[45] Date of Patent: Apr. 15, 1986

[54] VARNISH-BONDED, CARBON-COATED METAL PRODUCTS

[75] Inventors: Ramaswami Neelameggham, Salt Lake City, Utah; John C. Priscu, Las Vegas, Nev.

[73] Assignee: Amax Inc., Greenwich, Conn.

[21] Appl. No.: 591,656

[22] Filed: Mar. 20, 1984

[51] Int. Cl.⁴ .............................................. C09D 5/08
[52] U.S. Cl. ................... 427/228; 427/388.1; 427/417; 427/443
[58] Field of Search ............ 427/228, 388.1, 443, 427/417

[56] References Cited

U.S. PATENT DOCUMENTS

| | | | |
|---|---|---|---|
| 2,016,139 | 10/1935 | Eddison | 427/228 |
| 2,191,580 | 2/1940 | Nowak | 427/228 |
| 2,341,513 | 2/1944 | Gilbert | 427/228 |
| 2,809,901 | 10/1957 | Bach | 427/228 |
| 4,314,005 | 2/1982 | Arias | 427/443 |

Primary Examiner—John D. Smith
Attorney, Agent, or Firm—Michael A. Ciomek; Eugene J. Kalil

[57] ABSTRACT

Metal substrates with a protective coating are provided, the coating being formed of a varnish-bonded, carbon-containing layer adherently bonded to the metal substrate. Optionally, the coating may also contain a dispersion of finely divided material selected from the group consisting of certain metal oxides and carbonates.

9 Claims, 2 Drawing Figures

VARNISH-BONDED, CARBON-COATED METAL PRODUCTS

This invention relates to non-metallic coatings for metal substrates and, in particular, to varnish-bonded, carbon-coated metal products in which the coating is characterized by being resistant to corrosion under environmental conditions.

STATE OF THE ART

It is known to protect metal articles by applying a protective coating thereto. Such protective coatings may be metallic, e.g., electrodeposited nickel, chromium, and the like; or the coating may be non-metallic.

One method of protecting a ferrous metal substrate is to apply a sacrificial coating which is anodic to the substrate so that it will corrode anodically in preference to the ferrous metal substrate and thus protect the substrate. Such metal coatings, e.g., aluminum, zinc, manganese, magnesium, etc., are applied by thermal diffusion, one method commonly employed being pack cementation. In addition to the sacrificial metal coating, a non-metallic layer may be applied as an overcoat to provide additional protection.

Thus, in U.S. Pat. No. 4,036,602, a method is disclosed for magnesium coating a ferrous metal substrate, following which a non-metallic layer is applied as an overcoat, the metallic layer being applied as a solution of soluble silicate salt selected from the group consisting of sodium silicate, potassium silicate, lithium silicate and ethyl silicate which is dried and then cured at a temperature of about 150° to 430° C. In a preferred embodiment, a conversion coating is applied to the cured silicate layer using a solution containing phosphoric acid, chromic acid and at least one chromate and phosphate-forming metal, such as aluminum and/or magnesium which is thermally cured (about 150° to 500° C.) to provide in effect a duplex coating, that is to say, a sacrificial coating of a magnesium-containing alloy and a glassy non-metallic overcoat.

The outer non-metallic coating is similar to an enamel and is hard and glassy. Coatings of this type have particular utility in corrosive environments, such as highly saline and/or marine atmospheres.

The present invention provides protectively coated metal articles using a polymerizable oil as the source of the coating, the coating being in the nature of a varnish produced from the oil by polymerization at an elevated temperature and containing carbon formed by thermally decomposing at least a portion of the varnish coating at an elevated decomposition temperature above the polymerization temperature. Optionally, the coating may advantageously contain a fine dispersion of metal oxides, such as alkaline earth metal oxides, magnesium oxide, aluminum oxide, titanium oxide and the like.

OBJECTS OF THE INVENTION

It is an object of the invention to provide a metal substrate having a varnish-bonded, carbon-containing coating thereon, with or without metal oxides.

Another object is to provide a process for coating a metal substrate with a varnish-bonded, carbon-containing coating.

Figure 2:
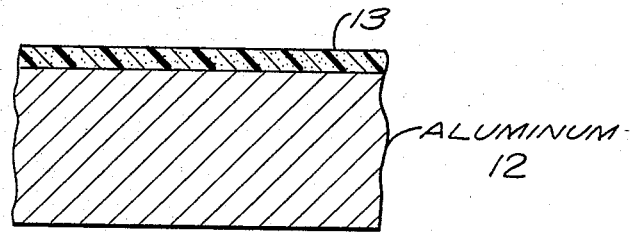

These and other objects will more clearly appear when taken in conjunction with the following disclosure, the appended claims and the accompanying drawing, wherein:

FIG. 1 is illustrative of one embodiment of the invention in which the coating is applied to a steel substrate; and FIG. 2 is illustrative of another embodiment in which the substrate is aluminum.

STATEMENT OF THE INVENTION

Stating it broadly, the invention is directed to a process for producing varnish-bonded, carbon-coated metal substrates. In one embodiment of the invention, the carbon coating is produced by contacting a surface of a substrate with a polymerizable oil to form a film thereon.

The coated substrate is then heated to a polymerizing temperature below the melting point of the metal under substantially non-oxidizing conditions to polymerize the oil film into substantially a varnish coating.

The temperature is then raised to the decomposition temperature of the varnish (below the melting point of the metal) to effect at least a partial conversion of the varnish to carbon and thereby provide a carbon-coated substrate in which the carbon is strongly bonded to the substrate by the varnish remaining on the substrate.

Finely divided metal oxides may be added to the oil prior to coating to enhance further the corrosion resistant properties. Examples of oxides are alkaline earth metal oxides (CaO, BaO, SrO) and carbonates thereof, magnesium oxide, aluminum oxide, titanium oxide, and the like, including powdered carbon, e.g., lamp black.

The polymerizing temperature may range from over about 20° C., e.g., 100° C. to about 175° C. or 250° C., while the decomposition temperature may range from about 250° C. to 350° C.

As illustrative of the invention, reference is made to FIG. 1 which shows a steel substrate 10 having a carbon-containing varnish coating 11 adhering thereto. In FIG. 2, the substrate being protected is aluminum (12) having a coating 13 bonded thereto. The coating may contain at least one of the aforementioned oxides in amounts ranging from about 5% to 50% by weight, e.g., about 5% to 25% by weight. The particle size is desirably less than 200 mesh (U.S. Standard) and more preferably less than 325 mesh, e.g., 30 microns or less. In place of or with the metal oxides, lamp black may be added.

The polymerizable oils suitable for coating metal substrates should have relatively high flash points and may include vegetable oils, such as corn oil, soybean oil, castor oil, linseed oil (drying oil) and seed oils (e.g., safflower oil). Animal fats may also be used, such as lard; and also high boiling petroleum oils, fatty acids, etc., the latter being mostly carbonized.

Examples of flash points of vegetable oils are as follows: castor oil which has a flash point at about 237° C., cottonseed oil which has a flash point at about 260° to 282° C., linseed oil which has a flash point at about 192° C. and corn oil which has a flash point of about 249° C., among many others. Generally speaking, the oil employed may have a flash point ranging from about 150° C. to 275° C.

To produce thick coatings, e.g., coatings of about 0.01 inch and higher, such as up to about 0.05 inch, the substrate may be coated with a film of oil (with or without the aforementioned additives) by spraying or by using a fluidized bed and the coating then thermally polymerized to produce a varnish followed by the application of additional oil which is also polymerized and so on. Thus, several or more layers may be added, with polymerization between layers, until the desired thickness has been produced. The polymerization is carried out in an enclosed retort under substantially non-oxidizing conditions. Powder carbon (e.g., lamp black) can also be added to the oil coating between polymerization stages.

In any event, the coated substrate is then heated to the decomposition temperature for a time at least sufficient to convert at least part of the varnish to carbon which is dispersed through the varnish to provide a carbon-containing layer. The coating is hard and corrosion resistant under environmental conditions.

The coating is applicable to a wide variety of metals, such as magnesium, aluminum, steel, copper and copper alloys, nickel and nickel alloys, iron-base alloys, including metals of melting point in excess of about 350° C. and generally in excess of 600° C.

In carbonizing the oil coating on the substrate, the temperature employed may range from about 250° C. to as high as 350° C. so long as the temperature is below the melting point of the metal substrate and maintained for a time sufficient to produce the coating. The carbon coating obtained is strongly bonded to the metal substrate by virtue of the polymerized varnish formed during heating.

As illustrative of one embodiment of the invention, the following examples are given:

EXAMPLE 1

A steel plate is cleaned by vapor blasting and the surface thereof sprayed with a layer of corn oil. The plate is placed in an enclosed heating chamber under substantially non-oxidizing conditions and the oil layer polymerized by heating to a temperature of about 200° C. for a time sufficient to polymerize it into a varnish. The plate is removed and another layer of oil sprayed on the polymerized layer and the additional layer polymerized in the same manner. The steps of spraying a layer of oil and polymerizing are repeated until a thickness of about 0.015 inch is obtained. The polymerized coatings or varnish layers are then subjected to an elevated temperature of about 250° to 300° C. for about 15 to 30 minutes to decompose a portion of the varnish to carbon and thereby provide a carbon-containing coating strongly bonded to the steel substrate by virtue of the undecomposed varnish present. The coating is substantially nonwetting and provides corrosion resistance.

In an alternative embodiment, about 10% to 15% by weight of alumina (minus 30 microns) may be added to provide a corrosion resistant composite coating. Drying agents, e.g., cobalt naphthenate) may also be added.

EXAMPLE 2

An aluminum plate is coated with cottonseed oil by spraying the oil containing an effective amount of cobalt naphthenate as a drying agent. The oil film on the plate is heated as in Example 1 to a polymerizing temperature of about 125° to 150° C. for a time sufficient to convert the layer to a varnish. The plate is removed and another layer of oil sprayed on to the surface of the plate and the oil layer also polymerized as aforementioned. The steps of oil spraying and polymerizing are repeated until a varnish coating of thickness of about 0.03 inch is obtained.

The coated plate is thereafter heated as in Example 1 to a decomposition temperature of the varnish coating for a time at least sufficient to convert part of the varnish to carbon and thereby produce a carbon-containing coating adherently bonded to the aluminum by the residual varnish present.

The term "oil" used herein is meant to include polymerizable oils, such as vegetable oils, animal fats and oils, aliphatic fatty acids, petroleum products and synthetic resins.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for producing a varnish-bonded, carbon-coated metal substrate which comprises:
    providing a metal substrate with a polymerizable oil coating on the surface thereof containing a dispersion of finely divided material selected from the group consisting of oxides and carbonates of the alkaline earth metal, magnesium oxide, aluminum oxide and titanium oxide ranging from about 5% to 50% by weight,
    heating said oil-coated metal substrate with the finely divided material dispersed therethrough to a polymerizing temperature below the melting point of said metal substrate under substantially non-oxidizing conditions to form a varnish coating on said substrate, and
    then raising the temperature of said varnish-coated substrate to a decomposition temperature below the melting point of the metal substrate to effect at least a partial conversion of said varnish to carbon and thereby produce a carbon coating strongly bonded to said substrate by means of said varnish containing said finely dispersed material.

2. The process of claim 1, wherein the polymerizing temperature ranges from over about 20° C. to 250° C.

3. The process of claim 2, wherein the temperature ranges from about 100° C. to 175° C.

4. The process of claim 1, wherein the polymerized layer with the finely divided material dispersed therein is produced by applying the oil and polymerizing the layer and repeating the steps of applying the oil layer and polymerizing it until a varnish layer of desired thickness is obtained containing a dispersion of said finely divided material.

5. The process of claim 2, wherein following polymerization, the coated metal substrate is heated to a decomposition temperature of said oil coating ranging from about 250° C. to 350° C.

6. The process of claim 1, wherein the metal substrate is formed of a metal of melting point of over 350° C.

7. The process of claim 2, wherein the oil employed is vegetable oil.

8. The process of claim 7, wherein the vegetable oil is corn oil.

9. A process for producing a varnish-bonded, carbon-coated metal substrate which comprises:
    providing a metal substrate with a polymerizable oil coating on the surface thereof containing a dispersion of finely divided metal oxide ranging from about 5% to 50% by weight,
    heating said oil-coated metal substrate with the finely divided metal oxide dispersed therethrough to a polymerizing temperature below the melting point of said metal substrate under substantially non-oxidizing conditions to form a varnish coating on said substrate, and then raising the temperature of said varnish-coated substrate to a decomposition temperature below the melting point of the metal substrate to effect at least a partial conversion of said varnish to carbon and thereby produce a carbon coating strongly bonded to said substrate by means of said varnish containing said finely dispersed metal oxide.

* * * * *